US006986339B2

(12) United States Patent
Joos et al.

(10) Patent No.: US 6,986,339 B2
(45) Date of Patent: Jan. 17, 2006

(54) METHOD, COMPUTER PROGRAM, MEMORY MEDIUM AND CONTROL AND/OR REGULATING UNIT FOR OPERATING AN INTERNAL COMBUSTION ENGINE, AS WELL AS INTERNAL COMBUSTION ENGINE, IN PARTICULAR FOR A MOTOR VEHICLE

(75) Inventors: Klaus Joos, Walheim (DE); Thomas Frenz, Noerdlingen (DE); Bernd Kudicke, Brackenheim (DE); Claus Schneider, Leinfelden-Echterdingen (DE); Markus Amler, Leonberg-Gebersheim (DE); Tobias Flaemig-Vetter, Esslingen (DE); Uwe Schaupp, Wernau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/799,798

(22) Filed: Mar. 12, 2004

(65) Prior Publication Data

US 2004/0237940 A1 Dec. 2, 2004

(30) Foreign Application Priority Data

Mar. 14, 2003 (DE) ................................ 103 11 141

(51) Int. Cl.
*F02M 37/04* (2006.01)
(52) U.S. Cl. ...................................... 123/498; 123/478

(58) Field of Classification Search ................ 123/498, 123/478, 486, 490, 467, 696; 239/102.2, 239/585.1, 585.5
See application file for complete search history.

(56) References Cited

U.S. PATENT DOCUMENTS

| 6,253,736 B1 * | 7/2001 | Crofts et al. ................. 123/498 |
| 6,499,464 B2 * | 12/2002 | Rueger ........................ 123/446 |
| 6,532,942 B2 * | 3/2003 | Zumstrull .................... 123/498 |
| 6,619,268 B2 * | 9/2003 | Rueger et al. ............... 123/490 |
| 2004/0008032 A1 * | 1/2004 | Rueger et al. .............. 324/522 |

FOREIGN PATENT DOCUMENTS

| DE | 198 54 789 | 8/1999 |
| DE | 101 48 217 | 4/2003 |
| EP | 1 311 004 | 5/2003 |

\* cited by examiner

*Primary Examiner*—Mahmoud Gimie
(74) *Attorney, Agent, or Firm*—Kenyon & Kenyon

(57) ABSTRACT

Method for operating an internal combustion engine in which fuel is injected into a combustion chamber by an injector. The injector has a drivable piezo-actuator. A setpoint value is generated for driving the piezo-actuator. A setpoint charge quantity ($QC_{setpoint}$) is determined from the setpoint value, and an actual charge quantity ($QC_{actual}$) supplied to the piezo-actuator is determined. The setpoint charge quantity ($QC_{setpoint}$) and the actual charge quantity ($QC_{actual}$) are combined, and the combined result ($S_{on}$) acts upon the drive circuit of the piezo-actuator.

9 Claims, 4 Drawing Sheets

METHOD, COMPUTER PROGRAM, MEMORY MEDIUM AND CONTROL AND/OR REGULATING UNIT FOR OPERATING AN INTERNAL COMBUSTION ENGINE, AS WELL AS INTERNAL COMBUSTION ENGINE, IN PARTICULAR FOR A MOTOR VEHICLE

FIELD OF THE INVENTION

The present invention relates to a method for operating an internal combustion engine in which fuel is injected into a combustion chamber by an injector, the injector having a drivable piezo-actuator, and in which a precontrol setpoint value is generated for driving the piezo-actuator. The present invention also relates to a computer program, a memory medium, a control and/or regulating unit and an internal combustion engine, in particular for a motor vehicle.

BACKGROUND INFORMATION

German Published Patent Application No. 101 48 217.5 describes an injector for injecting fuel whose valve needle is connected to a piezo-actuator. When a voltage is applied to the piezo-actuator, the latter undergoes a change in length that it transmits to the valve needle. This lifts the needle from its valve seat so that fuel can be injected under high pressure from the injector into the combustion chamber of the internal combustion engine.

To drive the piezo-actuator, a setpoint value is generated, which not only is dependent on the desired fuel mass or volume to be injected, but in relation to which other influencing variables that could corrupt the setpoint value must also be taken into account. Influencing variables of this type are, for example, injector temperature or ageing or manufacturing tolerance or similar factors.

The fact that the capacitance of the piezo-actuator must be taken into account when determining the current applied to the piezo-actuator is known from German Published Patent Application No. 198 54 789.7. This is intended to allow the piezo-actuator to be controlled more precisely.

SUMMARY OF THE INVENTION

An object of the present invention is to provide a method of the type mentioned above so that the fuel is more precisely injectable.

According to the present invention, this object is achieved by a method of the type mentioned above by determining a setpoint charge quantity from the setpoint value; determining an actual charge quantity supplied to the piezo-actuator; combining the setpoint charge quantity and the actual charge quantity; and applying the combined result to the drive circuit of the piezo-actuator. The object is achieved according to the present invention in the same manner for a computer program, a memory medium, a control and/or regulating unit and an internal combustion engine.

The present invention represents a charge regulating system for driving the piezo-actuator. Based on the charge regulating system, the piezo-actuator, and thus the fuel volume to be injected, is very precisely adjustable using the method according to the present invention. This has a positive effect on the fuel consumption of the internal combustion engine and also results in a better emission performance of an internal combustion engine operated in such a manner.

In particular, it has been demonstrated that a charge regulating system is much less sensitive to ageing of the piezo-actuator. The same is also true for the prior history of the piezo-actuator, for example its production and any tolerances or similar parameters that occur. The charge regulating system is also much less sensitive to temperature changes and similar influences. These influencing variables thus have little or no effect on fuel metering. However, it allows fuel metering to be carried out more precisely than before using a piezo-actuator, in particular over a longer period of time.

According to an advantageous embodiment of the present invention, a current for driving the piezo-actuator is determined from the setpoint charge quantity, and the combined result acts upon the current. This current is used to ultimately drive the piezo-actuator. It is particularly advantageous if the setpoint charge quantity is applied to a preset activation period.

This has the particular advantage that the activation time may be specified independently of the charge regulating system. The activation time may thus be specified as needed on the basis of the injection provided. For example, it may meet the time conditions for multiple injections within a single operating cycle. The piezo-actuator is influenced, according to the present invention, by varying the current driving the piezo-actuator. This makes it possible to influence the charge transported to the piezo-actuator and thus the piezo-actuator stroke, using an independently specifiable current activation time, as mentioned above.

According to an advantageous embodiment of the present invention, the actual charge quantity is determined at the end of the activation time. This makes it possible to measure the charge accurately.

It is particularly advantageous to use the above-mentioned charge regulating system to open the injector.

According to an advantageous embodiment of the present invention, a voltage regulating system is provided for the piezo-actuator, preferably for the purpose of closing the injector. This makes it possible to recover the energy. In addition, the use of a predefinable deactivation time ensures that the piezo-actuator is largely discharged at the end of this deactivation time. The deactivation time, in turn, is independent of the voltage regulating system and is thus adjustable to the time conditions of the injection or multiple injections.

To fully discharge the piezo-actuator it is advantageously possible to discharge the latter as quickly as possible using a resistor, in particular a connectable one.

The present invention also relates to a computer program that is suitable for carrying out the above method when it is run on a computer. It is particularly preferable if the computer program is stored on a memory medium, in particular in a flash memory.

The subject of the present invention is also a control and/or regulating unit for operating an internal combustion engine. To achieve performance- and emissions-optimized operation of the internal combustion engine, it is proposed that the control and/or regulating unit includes a memory on which a computer program of the type mentioned above is stored.

The present invention also relates to an internal combustion engine having a combustion chamber and a fuel-injection device that includes a piezo-actuator and via which the fuel reaches the combustion chamber. To achieve performance- and emissions-optimized operation of the internal combustion engine, it is proposed that it includes a control and/or regulating unit of the type mentioned above.

Additional features, applications and advantages of the present invention are derived from the following description of exemplary embodiments of the present invention, which are illustrated in the figures of the drawing. All descriptive or illustrative features form the subject of the present invention, either alone or in any combination, irrespective of their reference and also irrespective of their formulation and illustration in the description and drawing, respectively.

DETAILED DESCRIPTION

Figure 1:
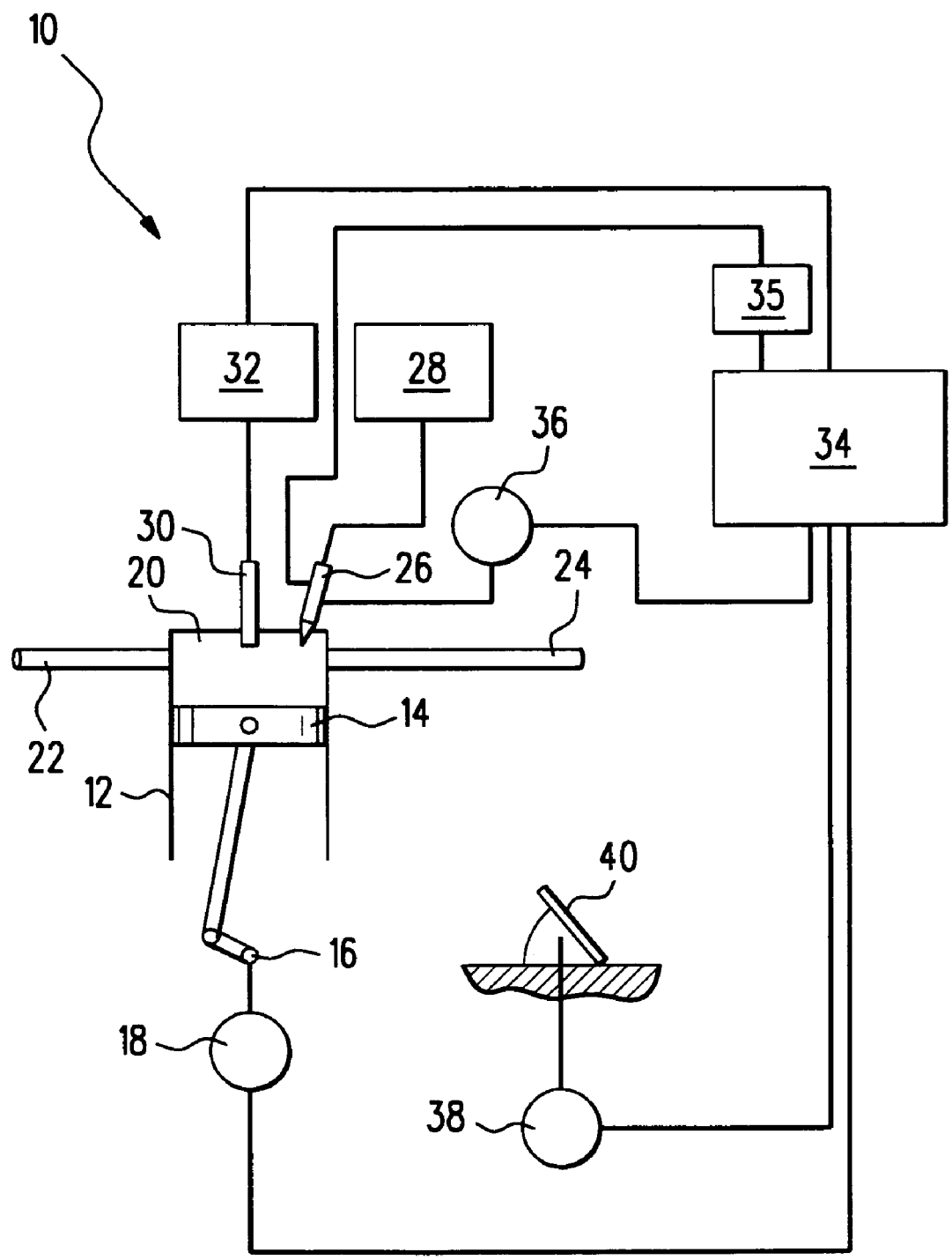
FIG. 1 shows a schematic block diagram of an exemplary embodiment of an internal combustion engine according to the present invention.

FIG. 1 shows an internal combustion engine 10 that is installed in a motor vehicle. Internal combustion engine 10 has multiple cylinders, of which only one cylinder 12 is illustrated in FIG. 1. It accommodates a piston 14 that drives a crankshaft 16. The speed of crankshaft 16 is detected by a speed sensor 18.

Combustion air is supplied to a combustion chamber 20 of cylinder 12 via an intake manifold 22 and an intake valve that is not illustrated in FIG. 1. The combustion exhaust gas is discharged from combustion chamber 20 via an exhaust pipe 24 that is connected to combustion chamber 20 via an exhaust valve, which is also not illustrated in FIG. 1. Fuel is injected directly into combustion chamber 20 via a fuel injection device designed as injector 26. Injector 26 is connected to a fuel system 28 that is illustrated only symbolically in FIG. 1. It includes a fuel tank, a pre-supply pump, a main supply pump and a rail that stores fuel under high pressure. Injector 26 is connected to the rail and built into cylinder 12 of internal combustion engine 10.

The fuel in combustion chamber 20 is ignited by a spark plug 30. The latter receives the energy needed for ignition from an ignition system 32. Ignition system 32, in turn, is driven by a control and/or regulating unit 34. On the output side, the latter is also connected via an output stage 35 to injector 26, which it controls. Output stage 35 is integratable into control and/or regulating unit 34. On the input side, control and/or regulating unit 34 receives signals from a temperature sensor 36 that detects the temperature of injector 26. Alternatively, the temperature of injector 26 may be determined, in particular, by forming a model from other operating variables of internal combustion engine 10, for example from the engine temperature, thus making it possible to eliminate temperature sensor 36. Speed sensor 18 is also connected to control and/or regulating unit 34. A position sensor 38, which detects the position of an accelerator pedal 40, also supplies signals to control and/or regulating unit 34.

Control and/or regulating unit 34 may be designed as an analog electronic circuit. Control and/or regulating unit 34 preferably includes a computer, for example a microprocessor having a flash memory. In addition, control and/or regulating unit 34 is connected to the sensors and actuators described above so that it is able to process their signals or generate signals for driving them. A computer program having a plurality of program commands is stored in the flash memory. The computer program is suitable for carrying out the method described below when it runs on the microprocessor.

Figure 2:
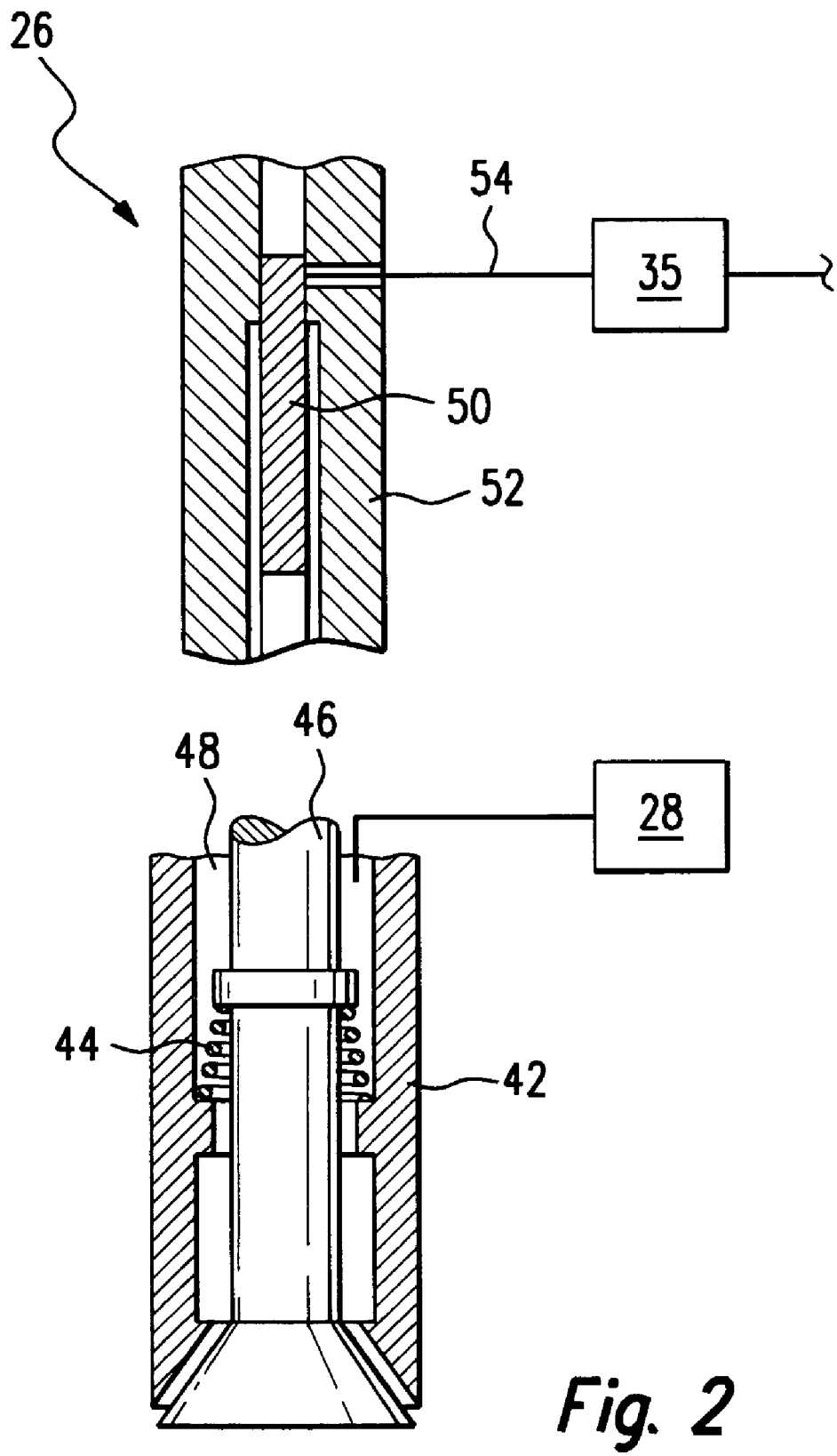
FIG. 2 shows a partial cross-sectional diagram of an exemplary embodiment of a fuel injection device for the internal combustion engine illustrated in FIG. 1.

FIG. 2 shows a more detailed view of injector 26. It includes a valve member 42 that movably accommodates a valve needle 46 surrounded by an annulus 48. Valve needle 46 opens "to the outside," i.e., into the combustion chamber. The free end of valve needle 46 has a conical shape and rests on a corresponding valve seat. When valve needle 46 is open, fuel system 28 is connected to the combustion chamber via annulus 48. In this open state, this arrangement produces a conical fuel jet that is directed into the combustion chamber.

The end of valve needle 46 facing away from the conical projection is permanently connected to a piezo-actuator 50. It may also be connected hydraulically, if necessary. Piezo-actuator 50 is a laminated column that includes a plurality of individual piezo-elements. The end of piezo-actuator 50 facing away from valve needle 46 is clamped by a housing 52 of the injector. Piezo-actuator 50 is connected to output stage 35 via control lines 54. The driving energy needed to move piezo-actuator 50 is supplied to piezo-actuator 50 via these lines in a manner to be illustrated below.

Internal combustion engine 10 works by direct gasoline injection and may thus be operated in stratified mode as well as in homogeneous mode. In stratified mode, an ignitable fuel mixture is present only in the vicinity of spark plug 30, while the remainder of combustion chamber 20 is, at least initially, largely free of fuel. This is achieved by injector 26 injecting fuel during a compression stroke of piston 14. However, it is also possible for injector 26 to inject fuel during an intake stroke of piston 14, which causes the fuel to be distributed largely homogeneously in combustion chamber 20 of internal combustion engine 10. Any combination of the two is also possible.

To carry out injection, control and/or regulating unit 34 applies an electrical driving energy to injector 26 via output stage 35. Piezo-actuator 50 is supplied with an electrical current for this purpose. As a result, piezo-actuator 50 is elongated in the longitudinal direction. This causes valve needle 46 to lift from its seat on valve member 42, so that valve needle 46 moves to its open state. A certain current flow during a certain period of time, which is equivalent to a certain charge, produces a certain stroke of valve needle 46. Valve needle 46 retains this stroke even after the certain period of time ends and the current flow is therefore no longer present.

To terminate injection, piezo-actuator 50 is discharged. For this purpose, a corresponding discharge current is supplied so that piezo-actuator 50 returns to its original length, and valve needle 46 comes to rest against its seat. This closing movement may be supported by a spring 44.

However, the length variation that piezo-actuator 50 undergoes when a current is applied thereto does not depend only on the current intensity, but also on a number of other variables. These variables influence the operating performance of piezo-actuator 50 and are therefore referred to as "influencing variables." One such influencing variable, for example, is temperature T of piezo-actuator 50. It is detected by temperature sensor 36 and transmitted to control and/or regulating unit 34. Alternatively, the temperature may also be determined from a model.

A further influencing variable is the age of piezo-actuator 50. This includes not only the age as measured in days, months and/or years, for example, but also the number of strokes that piezo-actuator 50 has already performed over the course of its life. The manufacturing tolerance under which piezo-actuator 50 was produced is another influencing variable. Due to different conditions during the manufacture of piezo-actuator 50, it is possible for essentially identical piezo-actuators to execute different strokes under the same driving energy.

Figure 3:
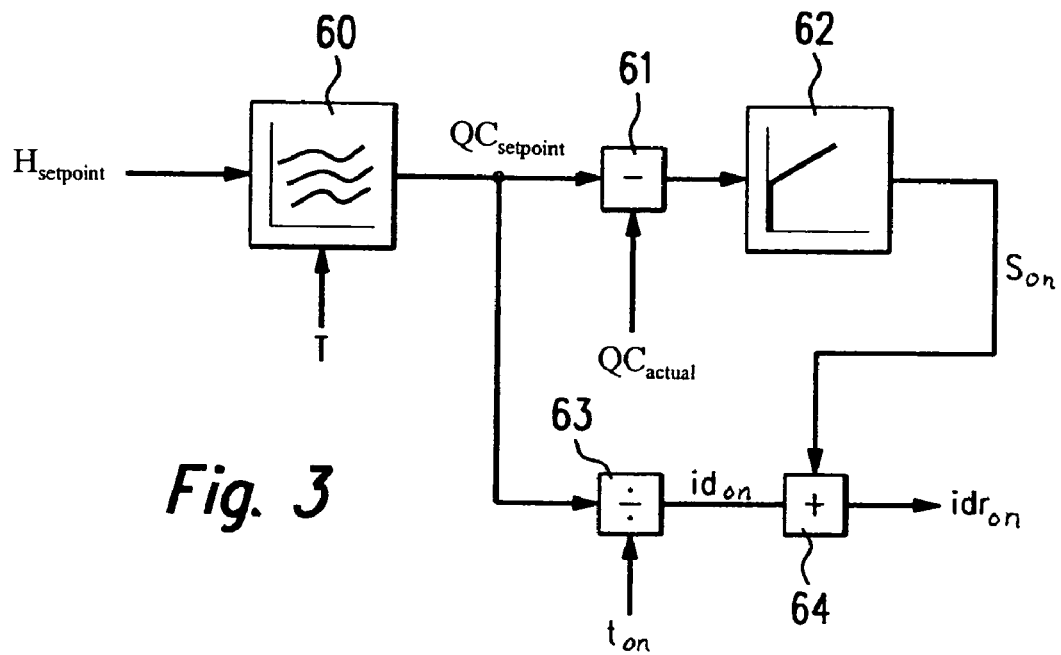
FIG. 3 shows an exemplary embodiment of a method according to the present invention, used to operate the internal combustion engine shown in FIG. 1 and the fuel injection device shown in FIG. 2.

FIG. 3 shows a method for regulating the drive of piezo-actuator 50 on a cylinder-specific basis. It relates to the portion of the drive circuit that is opened by injector 26. This method is based on a setpoint stroke $H_{setpoint}$ that represents the desired stroke of valve needle 46 of injector 26 to be executed by the latter during an activation time $t_{on}$. Setpoint stroke $H_{setpoint}$ may be determined in a number of different ways, which are not described in further detail here, and corrected as needed.

In a block 60 of FIG. 3, setpoint stroke $H_{setpoint}$ is converted to a setpoint charge quantity $QC_{setpoint}$. This conversion may be carried out, for example, on the basis of prior measurements, using a characteristic curve or a characteristic map, it also being possible to take into account temperature T of injector 26. Setpoint charge quantity $QC_{setpoint}$ is the charge that is supplied to injector 16 for valve needle 46 of injector 26 to execute desired setpoint stroke $H_{setpoint}$.

A portion of the current applied to piezo-actuator 50 of injector 26 is supplied (in a manner that is not illustrated) to a capacitor, for example in the form of a parallel circuit. During activation time $t_{on}$ of the current, i.e., while piezo-actuator 50 is being driven, this capacitor is thus also charged. After each activation time, the voltage at the capacitor represents a value for the charge quantity supplied to piezo-actuator 50. In FIG. 3, this value is shown as actual charge quantity $QC_{actual}$. The charge measurement is carried out consecutively for each activation time of piezo-actuator 50 so that a corresponding actual charge quantity $QC_{actual}$ is present each time a charge quantity is supplied to piezo-actuator 50.

Setpoint charge quantity $QC_{setpoint}$ and actual charge quantity $QC_{actual}$ are subsequently compared to each other in a block 61. The difference between the two charge quantities is supplied to a PI controller 62, whose output signal $S_{on}$ forms the actuating signal of a charge regulating circuit constructed in this manner.

A current $id_{on}$ is also determined from setpoint charge quantity $QC_{setpoint}$. This is done by applying setpoint charge quantity $QC_{setpoint}$ to activation time $t_{on}$ in a block 63, or by dividing the setpoint charge quantity by the time. In other words, current $id_{on}$ that flows during activation time $t_{on}$ is determined so that setpoint charge quantity $QC_{setpoint}$ is transported to piezo-actuator 50 of injector 26 during this activation time $t_{on}$.

Activation time $t_{on}$ is the period of time during which current $id_{on}$ is being applied to piezo-actuator 50 by output stage 35 so that valve needle 46 of injector 26 executes desired setpoint stroke $H_{setpoint}$. Current $id_{on}$ is an average current that may be generated, in particular, by a clocked activation and deactivation of a current actually generated during activation time $t_{on}$.

The output signal of PI controller 62 is then cumulatively added to current $id_{on}$ in a block 64. The deviation between setpoint charge quantity $QC_{setpoint}$ and actual charge quantity $QC_{actual}$ is taken into account by the current applied to piezo-actuator 50. This produces a current $idr_{on}$ which—as indicated above—is converted, if necessary, to a clocked current by output stage 35 and subsequently supplied to piezo-actuator 50 of injector 26. The charge regulating circuit is closed by the above-mentioned charge measurement and the resulting determination of actual charge quantity $QC_{actual}$.

Figure 4:
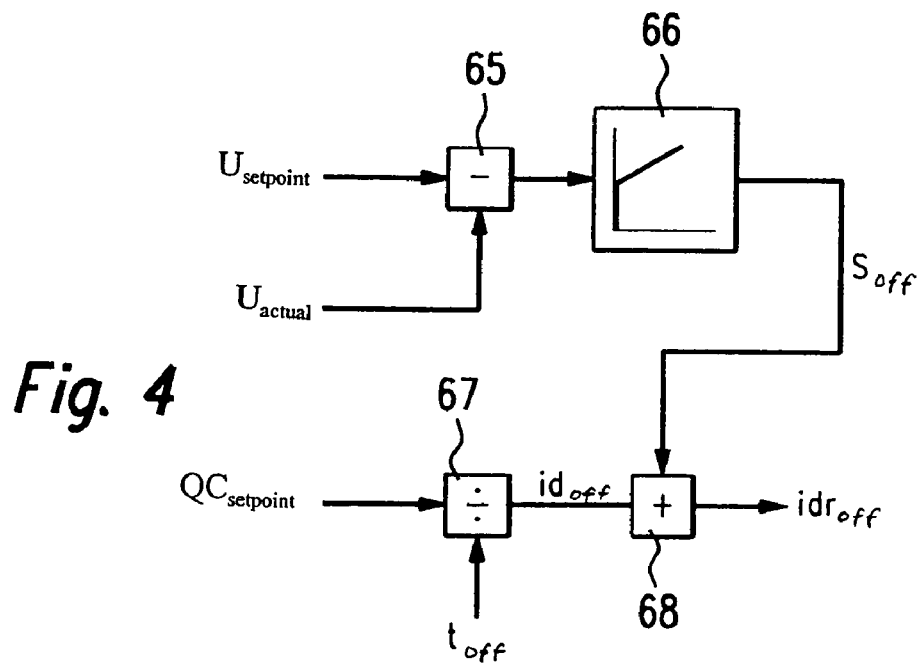
FIG. 4 shows an exemplary embodiment of a method according to the present invention, used to operate the internal combustion engine shown in FIG. 1 and the fuel injection device shown in FIG. 2.

FIG. 4 shows a method for regulating the drive of piezo-actuator 50 on a cylinder-specific basis. It relates to the portion of the drive circuit that is closed by injector 26. This method is based on a setpoint voltage $U_{setpoint}$ that represents the desired voltage that is present at piezo-actuator 50 of injector 26 and is to be assumed by the latter at the end of a deactivation time $t_{off}$. Setpoint voltage $U_{setpoint}$ may be determined in a number of different ways, which are not described in further detail here, and corrected as needed.

At the end of deactivation time $t_{off}$ mentioned above, the voltage present at piezo-actuator 50 is measured (in a manner that is not illustrated). This represents an actual voltage $U_{actual}$.

Setpoint voltage $U_{setpoint}$ and actual voltage $U_{actual}$ are compared to each other in a block 65. The difference between the two voltages is supplied to a PI controller 66, whose output signal $S_{off}$ forms the actuating signal of a voltage regulating circuit constructed in this manner.

A current $id_{off}$ is also determined from setpoint charge quantity $QC_{setpoint}$ mentioned above. This is done by applying setpoint charge quantity $QC_{setpoint}$ to deactivation time $t_{off}$ in a block 67, or by dividing the setpoint charge quantity by the time. In other words, current $id_{off}$ that flows during deactivation time $t_{off}$ is determined so that setpoint charge quantity $QC_{setpoint}$ is transported away again from piezo-actuator 50 of injector 26 during this deactivation time $t_{off}$.

Deactivation time $t_{off}$ is the period of time during which current $id_{off}$ is being applied to piezo-actuator 50 by output stage 35 so that valve needle 46 of injector 26 is closed again. Current $id_{off}$ is an average current that may be generated, in particular, by a clocked activation and deactivation of the current actually generated over deactivation time $t_{off}$. Current $id_{off}$ is reversed relative to current $t_{on}$.

The output signal of PI controller 66 is then cumulatively added to current $id_{off}$ in a block 68. The deviation between setpoint voltage $U_{setpoint}$ and actual voltage $U_{actual}$ is taken into account by the current applied to piezo-actuator 50. This produces a current $idr_{off}$ which—as indicated above—is also converted, if necessary, to a clocked current by output stage 35 and subsequently supplied to piezo-actuator 50 of injector 26. The voltage regulating circuit is closed by the above-mentioned voltage measurement and the resulting determination of actual voltage $U_{actual}$.

Figure 5:
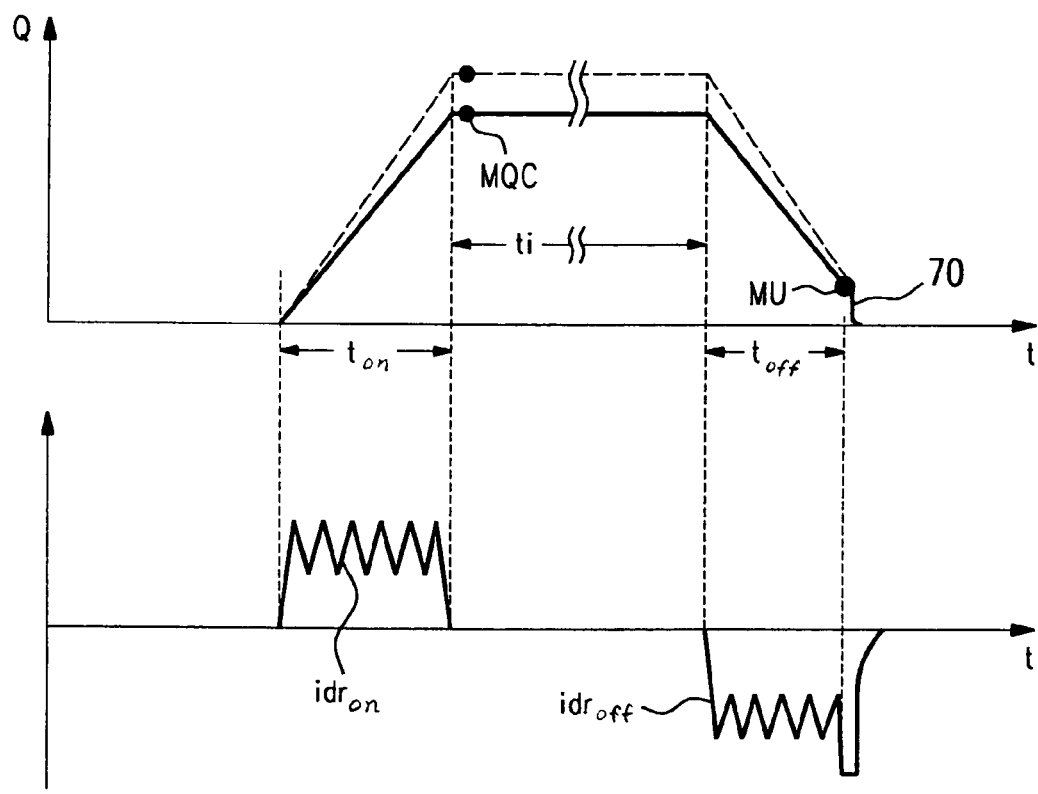
FIG. 5 shows a schematic time diagram of the fuel injection device shown in FIG. 2 after the charge has been supplied according to the methods in FIGS. 3 and 4.

FIG. 5 shows the variation over time of a fuel injection operation by injector 26. Charge Q present in piezo-actuator 50 is shown in FIG. 5 over time t.

During activation time $t_{on}$, current $idr_{on}$ is applied to piezo-actuator 50, as described above. This represents a charge supplied to piezo-actuator 50, which corresponds to the ascending portion of the curve shown in FIG. 5. As mentioned earlier, actual charge quantity $QC_{actual}$ is measured at the end of activation time $t_{on}$. This is represented in FIG. 5 by a measuring point MQC.

If actual charge quantity $QC_{actual}$ does not correspond to desired setpoint charge quantity $Q_{setpoint}$ at this measuring point MQC, current $idr_{on}$ present at piezo-actuator 50 is influenced correspondingly by PI controller 62, as described in connection with FIG. 3. For example, if actual charge quantity $QC_{actual}$ is less than setpoint charge quantity $QC_{setpoint}$, current $idr_{on}$ is increased.

This increased current $idr_{on}$ does not take effect until the next injection. At this time, increased current $idr_{on}$ increases the charge supply to piezo-actuator 50. This is represented by the dotted lines in FIG. 5. New actual charge quantity $QC_{actual}$ is measured again, and the method described above is repeated.

This procedure achieves two goals: first, the charge supplied to piezo-actuator 50 is always supplied during activation time $t_{on}$. Activation time $t_{on}$ is therefore a fixed quantity that may be specified by other parameters, yet it is not varied by the charge regulating circuit described above. Secondly, in the case of the charge regulating circuit shown in FIG. 3, the charge supplied to piezo-actuator 50 is regulated by current $idr_{on}$ transporting the charge. This current $idr_{on}$ is supplied, if necessary in a clocked manner, to piezo-actuator 50 via output stage 35.

During deactivation time $t_{off}$, current $idr_{off}$ is applied to piezo-actuator 50, as described above. Current $idr_{off}$ during deactivation time $t_{off}$ is reversed relative to current $idr_{on}$ during activation time $t_{on}$. This means that the charge is transported away from piezo-actuator 50, which is represented by the descending portion of the curve shown in FIG. 5. As mentioned above, actual voltage $U_{actual}$ is measured at the end of deactivation time $t_{off}$. This is represented by a measuring point MU in FIG. 5.

If actual voltage $U_{actual}$ does not correspond to desired setpoint voltage $U_{setpoint}$ at this measuring point MU, current $idr_{off}$ present at piezo-actuator 50 is influenced correspondingly by PI controller 66, as described in connection with FIG. 4. For example, if actual voltage $U_{actual}$ is greater than setpoint voltage $U_{setpoint}$, current $idr_{off}$ is increased in value.

This increased current $idr_{off}$ does not take effect until the next injection. At this time, increased current $idr_{off}$ increases the removal of the charge from piezo-actuator 50. This is represented by the dotted lines in FIG. 5. New actual voltage $U_{actual}$ is measured again, and the method described above is repeated.

Setpoint voltage $U_{setpoint}$ may be, for example, 15 volts. The voltage regulating circuit in FIG. 4 thus sets actual voltage $U_{actual}$ as accurately as possible, for example to 15 volts, at the end of deactivation time $t_{off}$. To fully discharge piezo-actuator 50, it is then possible to short-circuit the latter via a resistor. As a result, the existing charge flows more or less abruptly away from piezo-actuator 50. This is represented by reference number 70 in FIG. 5.

This procedure achieves two goals: first, the charge to be transported away from piezo-actuator 50 is always discharged during deactivation time $t_{off}$. Deactivation time $t_{off}$ is therefore a fixed quantity that may be specified by other parameters, yet it is not varied by the voltage regulating circuit described above. Secondly, in the case of the voltage regulating circuit shown in FIG. 4, the charge to be transported away from piezo-actuator 50 is regulated by current $idr_{off}$ transporting the charge. This current $idr_{off}$ is reversed via output stage 35 and supplied, if necessary in a clocked manner, to piezo-actuator 50. The charge remaining after deactivation time $t_{off}$ may be removed from piezo-actuator 50, for example, by a resistor.

Charge Q in FIG. 5 supplied to piezo-actuator 50 over time t corresponds to the stroke executed by valve needle 46. In the ascending portion of the curve shown in FIG. 5, valve needle 46 is lifted from its seat, thereby opening the injector, while in the descending portion, valve needle 46 returns to its closed state. This makes it possible to ultimately influence the stroke of valve needle 46 by influencing the ascending and descending portions of the curve shown in FIG. 5, as described above. However, this stroke and driving time $t_i$ occurring between the activation and deactivation times (see FIG. 5) is equivalent to the injected fuel volume or mass. The methods described above may therefore be used to regulate the injected fuel volume or mass.

What is claimed is:

1. A method for operating an internal combustion engine, comprising:
   injecting a fuel into a combustion chamber via an injector that includes a drivable piezo-actuator;
   generating a setpoint value for driving the piezo-actuator;
   determining a setpoint charge quantity from the setpoint value;
   determining an actual charge quantity supplied to the piezo-actuator;
   combining the setpoint charge quantity and the actual charge quantity to produce a combined result;
   causing the combined result to act upon a drive circuit of the piezo-actuator;
   generating a setpoint voltage for driving the piezo-actuator;
   determining an actual voltage present at the piezo-actuator;
   combining the setpoint voltage and the actual voltage to produce a second combined result; and
   causing the second combined result to act upon the drive circuit of the piezo-actuator.

2. The method as recited in claim 1, further comprising:
   determining a second setpoint charge quantity;
   determining a second current for driving the piezo-actuator from the second setpoint charge quantity; and
   causing the second combined result to act upon the second current.

3. The method as recited in claim 2, further comprising:
   applying the second setpoint charge quantity to a preset deactivation time.

4. The method as recited in claim 3, further comprising:
   determining the actual voltage at an end of the deactivation time.

5. The method as recited in claim 1, further comprising:
   causing the PI controller to influence the second combined result.

6. The method as recited in claim 1, wherein:
   the method is used to close the injector.

7. The method as recited in claim 6, further comprising:
   one of discharging and short-circuiting the piezo-actuator via a resistor.

8. A memory medium on which is stored a computer program that is programmed to perform the following:
   injecting a fuel into a combustion chamber via an injector that includes a drivable piezo-actuator;
   generating a setpoint value for driving the piezo-actuator;
   determining a setpoint charge quantity from the setpoint value;
   determining an actual charge quantity supplied to the piezo-actuator;
   combining the setpoint charge quantity and the actual charge quantity to produce a combined result;
   causing the combined result to act upon a drive circuit of the piezo-actuator;
   generating a setpoint voltage for driving the piezo-actuator;

determining an actual voltage present at the piezo-actuator;

combining the setpoint voltage and the actual voltage to produce a second combined result; and causing the second combined result to act upon the drive circuit of the piezo-actuator.

9. A control and/or regulating unit capable of causing the following to be performed:

injecting a fuel into a combustion chamber via an injector that includes a drivable piezo-actuator;

generating a setpoint value for driving the piezo-actuator;

determining a setpoint charge quantity from the setpoint value;

determining an actual charge quantity supplied to the piezo-actuator;

combining the setpoint charge quantity and the actual charge quantity to produce a combined result;

causing the combined result to act upon a drive circuit of the piezo-actuator;

generating a setpoint voltage for driving the piezo-actuator;

determining an actual voltage present at the piezo-actuator;

combining the setpoint voltage and the actual voltage to produce a second combined result; and causing the second combined result to act upon the drive circuit of the piezo-actuator.

* * * * *